(12) United States Patent
Ce (10) Patent No.: US 10,445,722 B2
(45) Date of Patent: Oct. 15, 2019

(54) SYSTEMS AND METHODS FOR ENABLING SECURE TRANSACTIONS WITH MOBILE DEVICES

(75) Inventor: Rafeeq Ce, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1024 days.

(21) Appl. No.: 13/976,539

(22) PCT Filed: Jul. 9, 2012

(86) PCT No.: PCT/US2012/045928
§ 371 (c)(1),
(2), (4) Date: Jun. 27, 2016

(87) PCT Pub. No.: WO2014/011144
PCT Pub. Date: Jan. 16, 2014

(65) Prior Publication Data
US 2016/0335619 A1    Nov. 17, 2016

(51) Int. Cl.
*G06Q 20/32*       (2012.01)
*H04W 4/80*        (2018.01)
(Continued)

(52) U.S. Cl.
CPC ........... *G06Q 20/327* (2013.01); *G06Q 20/02* (2013.01); *G06Q 20/204* (2013.01);
(Continued)

(58) Field of Classification Search
None
See application file for complete search history.

(56) References Cited

U.S. PATENT DOCUMENTS 9,665,998 B1 *  5/2017  Shields ................. G06Q 10/02
2008/0058014 A1  3/2008  Khan et al.
(Continued)

FOREIGN PATENT DOCUMENTS

CN    102257524 A    11/2011
CN    102282578 A    12/2011
(Continued)

OTHER PUBLICATIONS

Office Action dated Sep. 5, 2017 for Chinese Patent Application No. 201280073839.7.
(Continued)

*Primary Examiner* — Kristy A Haupt
(74) *Attorney, Agent, or Firm* — Schiff Hardin LLP (57) ABSTRACT

Techniques for enabling transactions using mobile devices are described herein. A mobile device is configured to wirelessly receive from a provider of products and services an encrypted near field communications (NFC) data exchange format (NDEF) message using an over-the-air communications standard different from the NFC standard. The NDEF message is decrypted to recover the NDEF payload. An NFC emulated card is generated from the information included in the NDEF payload and stored in the mobile device. The NFC emulated card is used to store funds for making payments. For conducting a transaction at the provider's place of business, the NFC emulated card is provided to a point-of-sale terminal for authorization, fund transfer, and completion of transaction.

29 Claims, 5 Drawing Sheets

(51) Int. Cl.

| | |
|---|---|
| *H04B 5/00* | (2006.01) |
| *G06Q 20/02* | (2012.01) |
| *G06Q 20/20* | (2012.01) |
| *G06Q 20/34* | (2012.01) |
| *G06Q 20/38* | (2012.01) |
| *G06Q 40/02* | (2012.01) |
| *H04W 12/06* | (2009.01) |
| *H04W 12/00* | (2009.01) |
| *H04W 12/02* | (2009.01) |
| *G06Q 50/30* | (2012.01) |

(52) U.S. Cl.
CPC ..... *G06Q 20/3229* (2013.01); *G06Q 20/3255* (2013.01); *G06Q 20/3278* (2013.01); *G06Q 20/351* (2013.01); *G06Q 20/3821* (2013.01); *G06Q 20/3823* (2013.01); *G06Q 40/02* (2013.01); *H04B 5/0031* (2013.01); *H04B 5/0056* (2013.01); *H04W 4/80* (2018.02); *H04W 12/0013* (2019.01); *H04W 12/06* (2013.01); *G06Q 50/30* (2013.01); *G06Q 2220/00* (2013.01); *H04W 12/02* (2013.01)

(56) References Cited

U.S. PATENT DOCUMENTS

| | | |
|---|---|---|
| 2010/0088188 A1 | 4/2010 | Kumar et al. |
| 2011/0289004 A1 | 11/2011 | Prakash et al. |
| 2012/0072309 A1 | 3/2012 | Hultberg et al. |
| 2012/0123945 A1 | 5/2012 | Charrat |

FOREIGN PATENT DOCUMENTS

| | | |
|---|---|---|
| EP | 1865689 A1 | 12/2007 |
| JP | 2006-268870 A | 10/2006 |
| JP | 2007-537506 A | 12/2007 |
| KR | 10-1086250 B1 | 11/2011 |
| WO | 2009/112793 A1 | 9/2009 |
| WO | 2011/089423 A2 | 7/2011 |
| WO | 2012/075410 A1 | 6/2012 |
| WO | 2014/011144 A1 | 1/2014 |

OTHER PUBLICATIONS

Extended European Search report received for European Patent Application No. 12880910.0, dated Dec. 17, 2015, 7 pages.
Office Action received for European Patent Application No. 12880 910.0, dated Mar. 13, 2017, 6 pages of European Office Action.
Notice of Allowance received for Japanese Patent Application No. 2015-513989, dated May 31, 2016, 3 pages of Japanese Office Action only.
Office Action received for Japanese Patent Application No. 2015-513989, dated Feb. 9, 2016, 15 pages of Japanese Office Action including 8 pages of English Translation.
Notice of Allowance received for Japanese Patent Application No. 2016-128848, dated Aug. 9, 2016, 3 pages of Japanese Notice of Allowance only.
Mattsson, M., "Security and Infrastructure for Mobile Phone Payments using Near Field Communication", KTH Industrial Engineering and Management, Master of Science Thesis, Stockholm, Sweden, 2010, 94 pages.
International Preliminary Report on Patentability and Written Opinion received for PCT Patent Application No. PCT/US2012/045928, dated Jan. 22, 2015, 9 pages.
International Search Report and Written Opinion received for PCT Patent Application No. PCT/US2012/045928, dated Feb. 28, 2013, 12 pages.

* cited by examiner

SYSTEMS AND METHODS FOR ENABLING SECURE TRANSACTIONS WITH MOBILE DEVICES

BACKGROUND

In many developing countries, it is estimated only 40% of the population has access to full banking services. Most of the banking services are concentrated in larger metropolitan areas. Lack of availability of banking services, especially in the rural under-developed areas, is seen as a hindrance to continued economic development. A traditional banking solution based on brick-and-mortar type investments in rural areas is viewed as too capital intensive and unaffordable for the masses.

Latest models of smart phones with 4G capabilities are being used in many of the larger metropolitan areas for applications such as web surfing, banking, navigation, video streaming, on-line shopping, social media interaction, and others. However, infrastructure for providing 4G services in rural areas is virtually non-existent thereby limiting their use and many of the earlier generation cellular phones that are currently in use in the rural areas have been typically limited to providing voice and text messaging services.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

It is recognized that in many rural areas, availability of 4G wireless services may be limited or non-existent. In addition, many users who may live in the rural areas may find the cost of owning and operating a smart phone with 4G capabilities to be very high and may not be economically justifiable. Therefore, mobile banking solutions that may be based on smart phone with 4G capabilities may not be practical or widely used in rural areas.

It is recognized that a growing number of cell phone manufacturers are introducing cell phones that have near field communications (NFC) functionality that is embedded into the subscriber identity module (SIM). Therefore, it is likely that mobile banking solutions based on cell phones equipped with a SIM card with embedded NFC functionality may become widely available in rural areas since they will be embedded in every cell phone.

A secure transaction system that includes one or more mobile devices and one or more transaction processing computers is configured to process transactions using secure wireless communications. As an initial step, a secure and authenticated link is configured between a transaction processing computer and a mobile computing device. The initial step may include validation of credentials and identities of both devices.

In an operating scenario, a mobile device included in the secure transaction system is not configured to support NFC communications but is configured to wirelessly communicate with the transaction processing computer using a standard that is different than the NFC communications. A secure encrypted message is received from a computing device of a vendor in accordance with a near field communications (NFC) data exchange format (NDEF) format. The NDEF message is decrypted by the mobile device to recover the NDEF payload.

An NFC emulated card is generated from the information included in the NDEF payload and stored in the mobile device. The NFC emulated card is used to store funds for making payments. For conducting a transaction at the vendor's place of business, the NFC emulated card is provided to a point-of-sale terminal for authorization, fund transfer, and completion of transaction.

The word "example" is used herein to mean serving as an example, instance, or illustration.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 1:
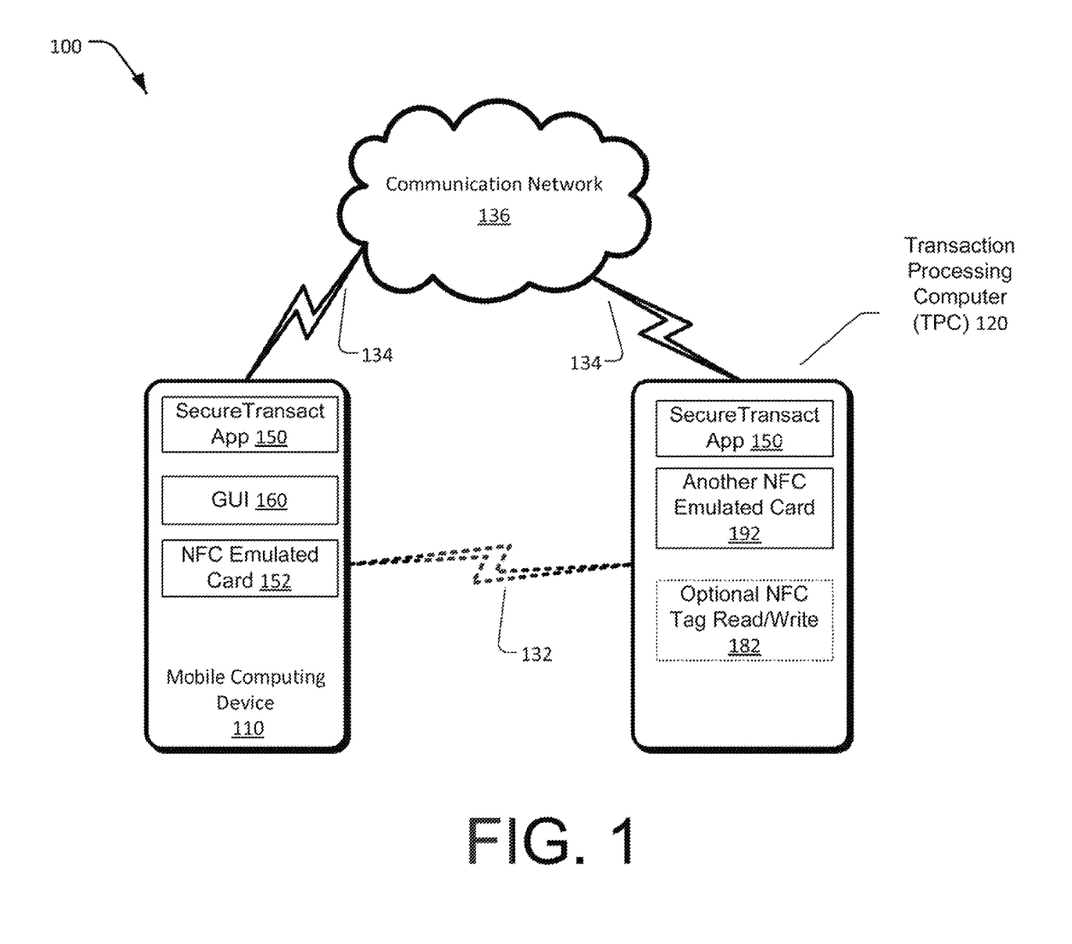
FIG. 1 illustrates a block diagram of a transaction processing system configured to process transactions.

FIG. 1 illustrates a block diagram of a secure transaction system 100 configured to process secure transactions between two computing devices. The devices may be owned and operated by two different parties respectively, e.g., a vendor's or merchant's computer and a consumer's mobile computing device, using wireless communications there between. Typical transactions that may be processed by the vendor and/or the consumer's devices may include credit/debit card transactions for buying and selling activities, banking transactions, web surfing, navigation, airline ticketing and reservations, and others.

The secure transaction system 100 includes a mobile computing device 110 operated by a user to wirelessly communicate with a transaction processing computer (TPC) 120 such as a point-of-sale (POS) terminal or server that may be operated by the vendor. The mobile computing device 110 is configured to securely and wirelessly communicate with the vendor's TPC 120 to process a transaction. It is understood that, unless otherwise stated, any communication network or device described herein may be implemented as a wired or wireless network or device. It is also understood that, unless otherwise stated, any communication network or device described herein may include antenna structures of varying designs to match frequencies used in the various wireless communication standards.

The mobile computing device 110 is configurable to wirelessly communicate with: 1) TPC 120 using an optional interface 132 for short distance communications, and 2) the Internet and with other wireless mobile devices via various mobile service providers using interface 134 and one or more communication networks 136.

The optional interface 132 includes two components, one component, which is included in the mobile computing device 110, and another component which is included in the TPC 120. The optional interface 132 may utilize a communications standard that may be configured for short distance communications such as an encrypted near field communications (NFC) standard or a Bluetooth standard.

The interface 134 may be based on IEEE 802.11 and/or 802.16 family of standards for wireless communications over longer distances. The interface 134 may be based on at least one of 2G, 2.5G, 3G or 4G technologies for wireless communications configured to support transfer of secure, encrypted messages.

As described herein, 1G analog technology was introduced in the 1970's and 1980's and was used for voice only messages. 2G technology introduced digitization of the analog signal and enabled digital transmission of data and voice messages. 2.5G was an intermediate technology that added multimedia messaging. 3G technology, introduced in the middle 2000's, enhanced multimedia messaging capabilities but did not provide a large enough bandwidth for functions such as live video streaming. Recently introduced 4G and 4G LTE technology support wireless communication functions for mobile devices that are comparable in performance to those offered on wired desktop and wi-fi laptop computers. Additional details of the mobile computing device 110 and the TPC 120 are described with reference to FIG. 2.

Although the interface 134 does not support short distance NFC communications, it sends/receives messages configured in NFC data exchange format (NDEF). NDEF published by NFC Forum specifies a common data format for NFC Forum-compliant devices and NFC Forum-compliant tags. The mobile computing device 110 and TPC 120 are configured to wirelessly exchange secure, encrypted short messaging service (SMS) or multimedia messaging service (MMS) over-the-air messages (offered by 2.5G or 3G technologies) based on NDEF. A NDEF message includes a NDEF record and the NDEF record includes an NDEF payload.

In some implementations, the NDEF message (or a message payload) may be sent over another network transport such as an Internet protocol (IP) network or a publicly mutable network, which may be 2G, 2.5G, 3G, 4G, WiFi, and similar others.

Processing of banking or financial transactions may include submitting an application for and receiving approval for a personal loan. The funds for the personal loan approved by the bank may be electronically transferred from the TPC 120 to the mobile device 110. As an initial step, a secure and authenticated link is configured between TPC 120 and the mobile computing device 110. The initial step may include validation of credentials and identities of both devices. The NDEF based message exchange during the initial set up may verify that the two devices are properly licensed and certified by a trusted publisher.

Once trust between the mobile computing device 110 and the TPC 120 is established in the initial set up, the two devices may exchange cryptographic keys used to protect future communications. The cryptographic keys may be accessed from a library of cryptographic keys implemented as hardware-protected keys for providing improved data protection. Encryption may be used to prevent a hacker from reading the contents of the message. Authentication may be used to prevent a hacker from sending a malicious message that the recipient, e.g., the mobile computing device 110, interprets as genuine.

A SecureTransact App 150 is an application or a program that is configured in the mobile computing device 110 to intercept a secure, encrypted SMS or MMS message received in NDEF format from the TPC 120 via the interface 134 and the network 136. The SecureTransact App 150 is further configured to extract funds and loan related information from the secure, encrypted message and generate an NFC emulated card 152 from the NDEF payload. The NFC emulated card 152, which is stored in memory; is used as a source of funds (like a credit or debit card) sanctioned by the loan to conduct financial transactions. In some applications, the SecureTransact App 150 may be configured to add the funds to an existing NFC emulated card 152 if already present or generate a new NFC emulated card if not present.

To use the funds that are electronically stored on the NFC emulated card 152, the user securely communicates with a vendor's or merchant's terminal via interface 134 or optionally (if present) via interface 132. In one application, the NFC emulated card 152 may be configured for one time use at a merchant terminal or may be configured for multiple uses. If the NFC emulated card 152 is configured for one time use, the NFC emulated card 152 is erased from the memory in response to the first time use to withdraw all available funds. If the NFC emulated card 152 is configured for multiple uses, then information stored on the NFC emulated card 152 may be protected by use of authentication tools such as passwords, PIN's, personalized patterns used as a signature, and others. If interface 132 is present and is configured to communicate using the NFC standard, the two NFC compliant devices, e.g., the mobile computing device 110 and an optional NFC tag read/write device 182 included in the TPC 120, are simply tapped with one another to authorize and complete the transaction using the NFC standard.

If interface 132 is not present, then the mobile computing device 110 generates and sends a secure, encrypted SMS or MMS message in NDEF format to the TPC 120 to authorize the transaction via interface 134 and the network 136. The TPC 120 also includes the SecureTransact App 150 to extract payment related information from the secure, encrypted message and generate another NFC emulated card 192 from the NDEF payload.

The operation of the SecureTransact App 150 is transparent to the user and is automatically activated only when encrypted SMS or MMS messages are sent or received using the NDEF format. Additional details of the SecureTransact App 150 are described with reference to FIG. 2.

Although not expressly shown in FIG. 1, the mobile computing device 110 and TPC 120 are both computing devices (or computer systems) that may include hardware, firmware, and/or software, which are configured to perform, at least in part, the techniques described herein. The computing devices may also include infrastructure software, application software, middleware, databases, knowledge bases, and similar other components. In addition, it is understood that the secure transaction system 100 may include additional number of mobile devices and/or computing devices to fit the transaction processing requirements.

In one operating scenario, the secure transaction system 100, shown in FIG. 1, may be easily adapted to process airline travel related transactions such as issuance of an electronic ticket or a boarding authorization to an authorized traveler. For example, an airline computer such as TPC 120 may send an electronic boarding card to a traveler's mobile device such as the mobile computing device 110 in the form of a secure, encrypted SMS or MMS message based on NDEF. The SecureTransact App 150 is configured to extract boarding or electronic ticketing related information from the secure, encrypted message and generate the NFC emulated card 152 from the NDEF payload. The NFC emulated card 152, which is stored in memory, is used as a boarding card/authorization by the traveler to board the airplane.

It is contemplated that the secure transaction system 100 may be adapted to process other types of transactions that presently use physical assets such as credit/debit cards, health insurance cards, employee ID card, and others that contain printed, magnetic, or optically coded confidential information and convert these physical assets into electronic NFC emulated cards that are stored in mobile computing device 110 in a secure manner.

Figure 2:
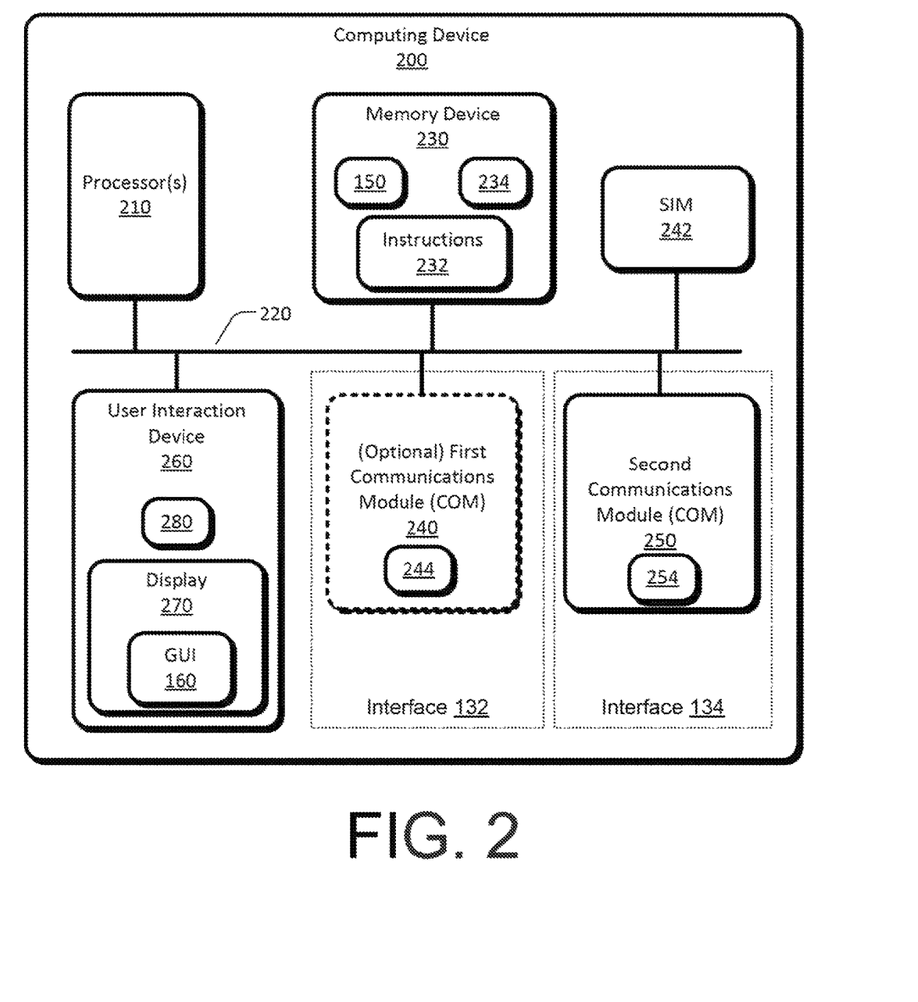
FIG. 2 is a block diagram illustrating additional details of a computing device described with reference to FIG. 1. The illustrated portions implement tools and techniques to conduct transactions described herein.

FIG. 2 is a block diagram illustrating additional details of a computing device 200 that may be used to implement the secure transaction system 100 described with reference to FIG. 1. The TPC 120 and the mobile computing device 110 described with reference to FIG. 1 are both computing devices that may be configured to have substantially the same computer system components (e.g., hardware, firmware, software, or any combination thereof) except for types of peripheral devices and loading/performance specifications for the components. Thus, the computing device 200 may be used in the transaction processing computer (TPC) 120 as well as the mobile computing device 110.

The computing device 200, which is a type of a computer system, includes a processor 210 coupled to a bus 220, a memory device 230 coupled to the processor via the bus 220, an optional first communications module (COM) 240 coupled to the processor 210 via the bus 220, a second COM 250 coupled to the processor 210 via the bus 220, a removable subscriber identity module (SIM) card 242 to identify and authenticate mobile subscribers, and a user interaction device 260 coupled to the processor 210 via the bus 220. The optional first COM 240 and the second COM 250 include antennas 244 and 254 respectively that are configured to receive/transmit wireless signals.

The user interaction device 260 may include a display 270 and an input device 280 such as a touch screen, a mouse, a trackball, or similar other cursor positioning peripheral configured to receive user input. The display 270 is configured to provide the GUI 160 for user interaction. Although not shown, the input device 280 may include a smaller sized QWERTY type fixed keypad for user input. In some applications, the display 270 and the input device 280 may be configured as separate components that may be directly coupled to the bus 220.

It should be understood that depending on the computing load more than one processor may be included in the mobile computing device 110 and the TPC 120. The memory device 230 is operable to store instructions or commands 232 that are executable by the processor 210 to perform one or more functions. It should also be understood that the term "computer system" is intended to encompass any device having a processor that is capable of executing program instructions from a memory medium. Various functions, processes 300, 400 and 500, methods, programs, and operations described herein may be implemented using the mobile computing device 110. For example, the processor 210 is operable to execute the instructions 232 associated with the SecureTransact App 150 stored in memory device 230 for processing secure, encrypted SMS or MMS messages in NDEF format.

The SecureTransact App 150 performs the functions including: detection of incoming encrypted SMS or MMS messages that use the NDEF format, and decrypting the message to recover the NDEF message that includes one or more NDEF records. Each NDEF record contains a payload. The payload includes the application data. The SecureTransact App 150 extracts transaction related application data from the NDEF payload and generates a NFC emulated card 234. Although not illustrated, the various functions performed by the SecureTransact App 150 may be implemented in various functional modules such as a detector or interceptor module, a decrypter module, a recovery module to recover payload, and a card emulation module. The NFC emulated card may be the same as the NFC emulated card 152 included in the mobile computing device 110 and the another NFC emulated card 192 included in TPC 120. Access to information stored on the NFC emulated card 234 may be protected by use of authentication tools such as passwords, PIN's, personalized patterns used as a signature, and others. In some applications, the NFC emulated card 234 may be configured to be automatically erased from the memory device 230 after one time use and reduce the security risk.

The components of the computing device 200 may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

In some implementations, the computing device 200 may provide support for NFC communications over shorter distances. In some configurations that offer NFC communications, the SIM 242 may be configured to provide embedded support for near field communications (NFC) functionality. In some implementations that are not configured to support NFC communications, the computing device 200 may be configured to communicate over-the-air with other devices using the secured SMS or MMS communications with NDEF to process transactions.

The optional first COM 240, which forms one of the two components of the interface 132, is configured to wirelessly communicate over short distances using a first communication standard. The first communication standard may include a near field communications (NFC) standard configured to provide secure authenticated communications between any two NFC compliant devices located in very close proximity or a Bluetooth standard. In sonic mobile device configurations, the SIM card 242 may be configured to embed the functionality of first COM 240 such as NFC communication.

The second COM 250 is configurable to wirelessly communicate with the communication network(s) 136 using a second communication standard. The second communication standard may be based on IEEE 802.11 family of standards for wireless local area network (WLAN). The mobile computing device 110 may also be configured to support IEEE 802.16 family of standards for wireless broadband devices such as 2G, 3G or 4G cell phones with LTE or WiMAX capability.

The optional first COM 240, may be configured to wirelessly communicate over short distances using the interface 132 and the first communication standard described with reference to FIG. 1. As previously described, the first communication standard may include a near field communications (NFC) standard configured to provide secure authenticated communications between any two NFC compliant devices. The first communication standard may also include the Bluetooth standard.

Near Field Communication (NFC) is a short-range wireless standard that enables secure authenticated wireless communication between NFC compliant devices over a short distance of approximately 2-20 centimeters. NFC is an ISO based standard. The ISO 14443 Type A and Type B standards+FeliCa is a four-part international standard for contact-less smart cards operating at 13.56 MHz in close proximity with a reader antenna. The ISO 18092 standard defines communication modes for NFC Interface and Protocol.

The NFC standard enables data transactions, data exchange, and wireless communications between two NFC compliant devices in close proximity to each other, e.g., located approximately within 2-20 centimeters. The NFC standard compliant devices may be configured to automatically discover one another. The mobile computing device 110 may be configured to query the TPC 120 and establish the wireless link. Set up time for automatically pairing two NFC compliant devices is typically less than 1 millisecond. Compared to the NFC standard, the Bluetooth standard typically supports communication over longer distances (e.g., up to 30 meters) and requires a longer set up time (e.g., about 5-6 seconds).

The second COM 250 may be used to communicate with other computing devices via the interface 134 the communication network 136 and a second communication standard. The second communication standard may be based on IEEE 802.11 family of standards for wireless local area network (WLAN). The mobile computing device 110 may also he configured to support IEEE 802.16 family of standards for wireless broadband devices such as 2G, 2.5G, 3G or 4G cell phones with long term evolution (LTE) or WiMAX capability.

The memory device 230 is operable toy to store instructions 232 that are executable by the first processor 210 to perform one or more functions such as execution of the SecureTransact App 150 to process transactions. The components of the computing device 200 may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

Figure 3:
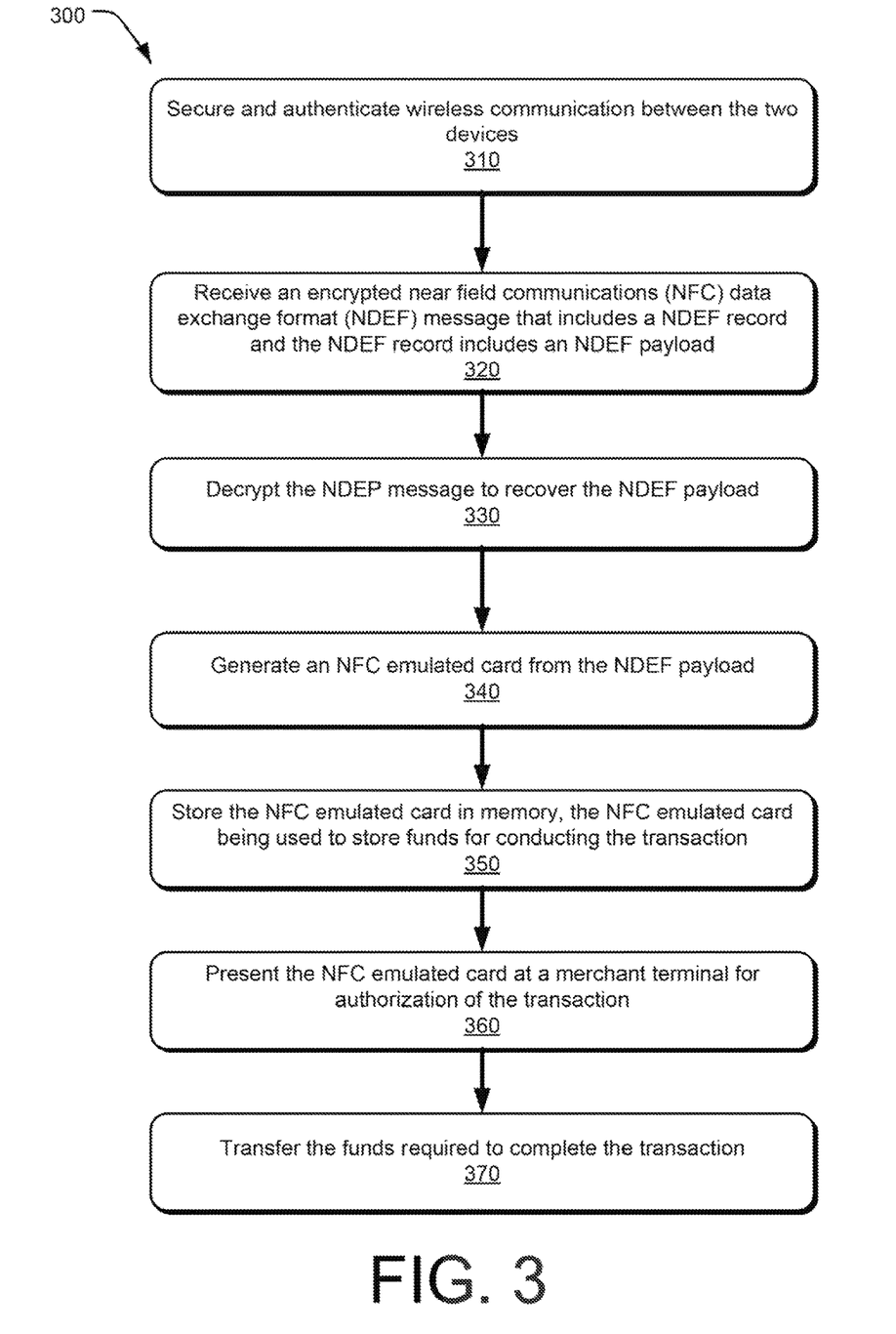
FIG. 3 a flow diagram illustrating a process to implement the techniques described herein for processing a financial transaction.

FIG. 3 is a flow diagram illustrating a process 300 that implements the techniques described herein for processing a financial transaction. The process is illustrated as a collection of blocks in a logical flow graph, which represents a sequence oaf operations that may be implemented in hardware, software, or a combination thereof. In the context of software, the blocks represent computer instructions that, when executed by one or more processors of such a computer, perform the recited operations. Note that the order in which the process is described is not intended to be construed as a limitation, and any number of the described process blocks may be combined in any order to implement the process, or an alternate process. Additionally, individual blocks may be deleted from the process without departing from the spirit and scope of the subject matter described herein.

At process 310, the TPC 120 and the mobile computing device 110 are secured and authenticated for wireless communications there between. At process 320, an encrypted near field communications (NFC) data exchange format (NDEF) message is received. The encrypted message, constructed in accordance with the NDEF structure, includes a NDEF record and the NDEF record includes an NDEF payload. At process 330, the NDEF message is decrypted to recover the NDEF payload. At process 340, an NFC emulated card is generated from the NDEF payload. At process 350, the NFC emulated card is stored in memory, the NFC emulated card being used to store funds for conducting the transaction. At process 360, the NFC emulated card presented at a merchant terminal is authorized for conducting the transaction. At process 370, the funds are transferred to complete the transaction.

Figure 4:
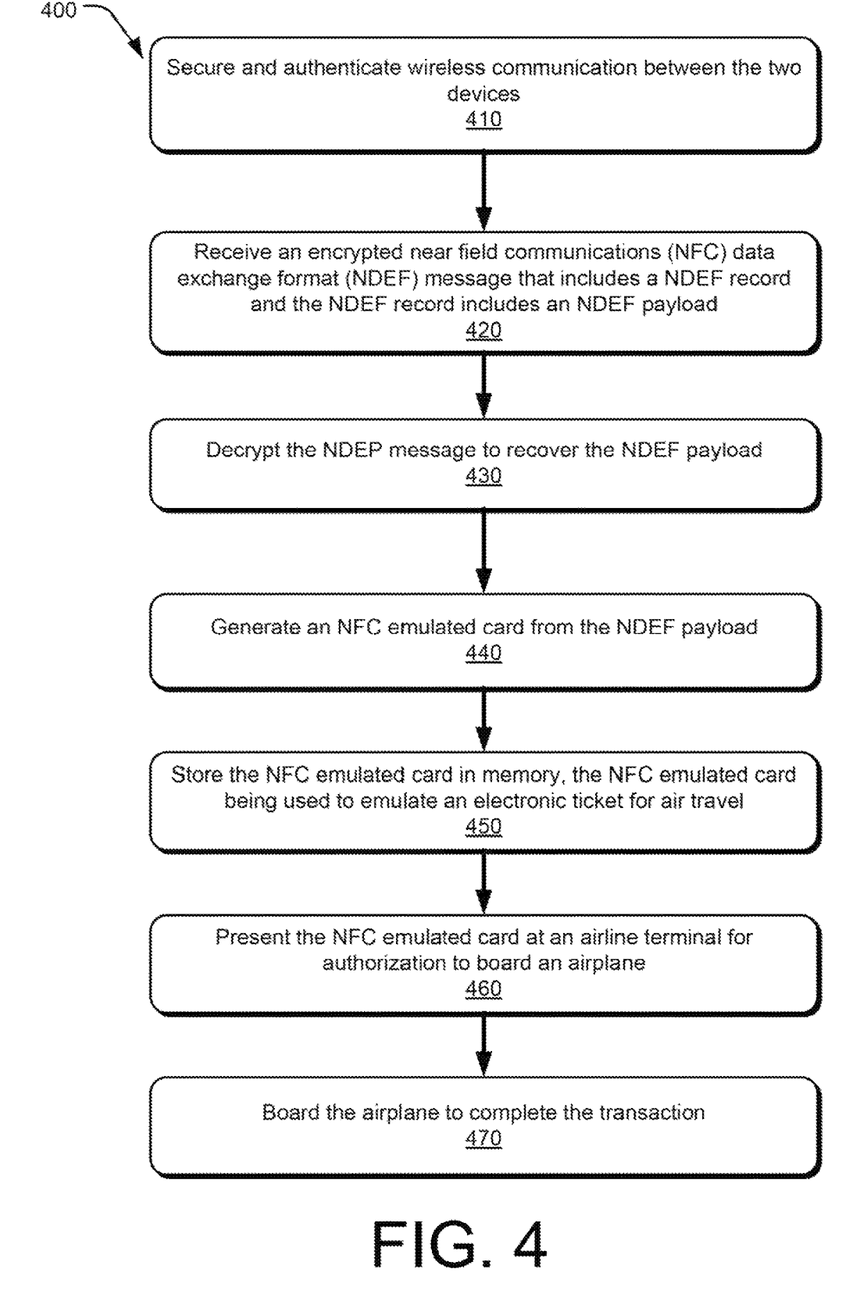
FIG. 4 a flow diagram illustrating a process to implement the techniques described herein for processing an airline ticketing transaction.

FIG. 4 is a flow diagram illustrating a process 400 that implements the techniques described herein for processing an airline transaction such as electronic ticketing. The process is illustrated as a collection of blocks in a logical flow graph, which represents a sequence of operations that may be implemented in hardware, software, or a combination thereof. In the context of software, the blocks represent computer instructions that, when executed by one or more processors of such a computer, perform the recited operations. Note that the order in which the process is described is not intended to be construed as a limitation, and any number of the described process blocks may be combined in any order to implement the process, or an alternate process. Additionally, individual blocks may be deleted from the process without departing from the spirit and scope of the subject matter described herein.

At process 410, the TPC 120 and the mobile computing device 110 are secured and authenticated for wireless communications there between. At process 420, an encrypted near field communications (NFC) data exchange format (NDEF) message is received. The encrypted message, constructed in accordance with the NDEF structure, includes a NDEF record and the NDEF record includes an NDEF payload. At process 430, the NDEF message is decrypted to recover the NDEF payload. At process 440, an NFC emulated card is generated from the NDEF payload. At process 450, the NFC emulated card is stored in memory, the NFC emulated card being used to emulate an electronic ticket required for air travel. At process 460, the NFC emulated card presented at an airline terminal is authorized for boarding an airplane. At process 470, the traveler boards an airplane to complete the transaction.

Figure 5:
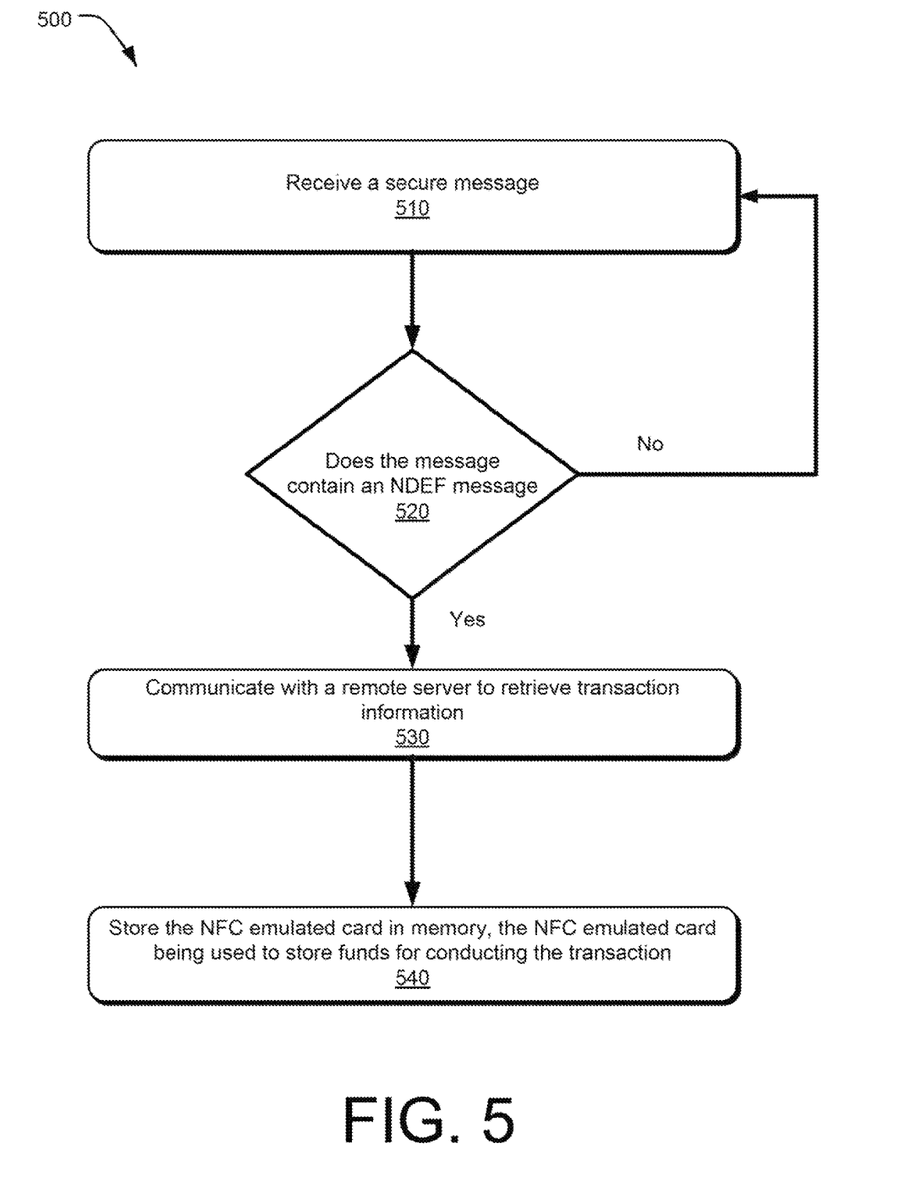
FIG. 5 a flow diagram illustrating a process to implement the techniques described herein for processing a secure transaction.

FIG. 5 is a flow diagram illustrating a process 500 that implements the techniques described herein for processing a secure transaction. At process 510, a secure encrypted message (e.g., SMS or MMS) is received. At process 520, it determined whether the secure message is a near field communications (NFC) data exchange format (NDEF) message. The NDEF message is constructed in accordance with the NDEF structure and includes a NDEF record and the NDEF record includes an NDEF payload. At process 530, a remote server is contacted to present the secure the transaction specific information recovered from the NDEF payload. At process 540, an NFC emulated card is received from the NDEF payload in response to the secure the transaction specific information. In this example, the NFC emulated card is received from a remote server such as TPC 120. This implementation may reduce the processing load on a mobile computing device such as mobile computing device 110. All messages sent or received may be encrypted to improve security.

The term "computer-readable media" includes computer-storage media. For example, computer-storage media may include, but are not limited to, magnetic storage devices (e.g., hard disk, floppy disk, and magnetic strips), optical disks (e.g., compact disk (CD), digital versatile disk (DVD), and Blue-ray Disk (BD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The following examples pertain to further embodiments. A mobile computing system configured to enable electronic ticketing, the mobile computing system comprising: a processor and a memory device coupled to the processor. The memory device is operable to store instructions executable by the processor to cause the processor to: receive an encrypted near field communications (NFC) data exchange format (NDEF) message including a NDEF record, the NDEF record including an NDEF payload: decrypt the NDEF message to recover the NDEF payload; generate an NFC emulated card from the NDEF payload; and store the NFC emulated card in the memory device, the NFC emulated card being used to emulate an electronic ticket.

In certain implementations, a mobile computing system further comprising instructions executable by the processor to cause the processor to authorize the NFC emulated card at an airline computer terminal for boarding an airplane; and transfer records included in the electronic ticket to the airline computer terminal.

In certain implementations, a mobile computing system wherein the encrypted NDEF message is received using an over-the-air communication standard that is different from the NFC standard.

In certain implementations, a mobile computing system further comprising instructions executable by the processor to cause the processor to send an encrypted outgoing NDEF message to the airline computer terminal for boarding the airplane, wherein the encrypted outgoing NFC message includes the NFC emulated card.

In certain implementations, a mobile computing system wherein the encrypted outgoing NDEF message is sent to the airline computer terminal using an over-the-air communication standard that is different from the NFC standard.

In certain implementations, a mobile computing system wherein the encrypted outgoing NDEF message is sent to the airline computer terminal using the NFC standard.

In certain implementations, a mobile computing system wherein the over-the-air communication standard is at least one of a short messaging service (SMS) and multimedia messaging service (MMS).

In certain implementations, a mobile computing system wherein the mobile computing device is configured to communicate using an over-the-air communications standard that is compatible with at least one of IEEE 802.16 family of standards for cellular phones.

In certain implementations, a mobile computing system wherein the mobile computing device includes a subscriber identity module (SIM), wherein the SIM includes NDEF messaging service as an embedded component.

In certain implementations, a mobile computing system wherein the mobile computing device is configured to erase the NFC emulated card after a one time use.

At least one computer-readable medium having stored thereon instructions for conducting a transaction using a mobile computing device, the instructions being executable to cause a computer processor included in the mobile computing device to: receive an encrypted near field communications (NFC) data exchange format (NDEF) message including a NDEF record, the NDEF record including an NDEF payload; decrypt the NDEF message to recover the NDEF payload; generate an NFC emulated card from the NDEF payload; and store the NFC emulated card in memory, the NFC emulated card being used to store funds for conducting the transaction, In certain implementations, a computer-readable medium wherein the instructions being executable to further cause the computer processor to: authorize the NFC emulated card at a merchant terminal for conducting the transaction; and transfer the funds to complete the transaction.

In certain implementations, a computer-readable medium wherein the encrypted NDEF message is received using an over-the-air communication standard that is different from the NFC standard.

In certain implementations, a computer-readable medium wherein the instructions being executable to authorize the NFC emulated card further cause the computer processor to: send an encrypted outgoing NDEF message to the merchant terminal for conducting the transaction, wherein the encrypted outgoing NDEF message includes the NFC emulated card.

In certain implementations, a computer-readable medium wherein the encrypted outgoing NDEF message is sent to the merchant terminal using an over-the-air communication standard that is different from the. NFC standard.

In certain implementations, a computer-readable medium wherein the encrypted outgoing NDEF message is sent to the merchant terminal using the NFC standard.

In certain implementations, a computer-readable medium wherein the over-the-air communication standard is at least one of a short messaging service (SMS) and multimedia messaging service (MMS).

In certain implementations, a computer-readable medium wherein the mobile computing device is configured to communicate using an over-the-air communications standard that is compatible with at least one of IEEE 802.16 family of standards for cellular phones.

In certain implementations, a computer-readable medium wherein the mobile computing device includes a subscriber identity module (SIM), wherein the SIM includes NDEF messaging service as an embedded component.

In certain implementations, a computer-readable medium wherein the mobile computing device is configured to erase the NFC emulated card after a one time use.

A method of implementing wireless communications, the method comprising: receiving an encrypted near field communications (NFC) data exchange format (NDEF) message including a NDEF record, the NDEF record including an NDEF payload; decrypting the NDEF message to recover the NDEF payload; sending information recovered from the NDEF payload to a server; and receiving an NFC emulated card from the server.

In certain implementations, a method further comprising generating an NFC emulated card from the NDEF payload, the NFC emulated card being configured for one time use.

In certain implementations, a method further comprising storing the NFC emulated card, the NFC emulated card being used to emulate a physical card, the NFC emulated card being configured to include confidential information also included in the physical card.

In certain implementations, a method wherein the encrypted NDEF message is received using an over-the-air communication standard that is different from the NFC standard.

In certain implementations, a method wherein the over-the-air communication standard is at least one of a short messaging service (SMS) and multimedia messaging service (MMS).

In certain implementations, a method wherein the over-the-air communications standard that is compatible with at least one of IEEE 802.16 family of standards for cellular phones.

An apparatus comprising: an intercept module coupled to intercept an encrypted near field communications (NFC) data exchange format (NDEF) message; a decrypter module operable to decrypt the encrypted NDEF message into a decrypted NDEF message; a recovery module operable to recover a NDEF record from the decrypted NDEF message, the NDEF record including an NDEF payload; and a card emulation module operable to generate a NFC emulated card from the NDEF payload.

In certain implementations, an apparatus wherein the NFC emulated card is configured for one time use.

In certain implementations, an apparatus wherein the encrypted NDEF message is received using an over-the-air communication standard that is different from the NFC standard.

In certain implementations, an apparatus wherein the over-the-air communication standard is at least one of a short messaging service (SMS) and multimedia messaging service (MMS).

In certain implementations, an apparatus wherein the NFC emulated card is stored in a subscriber identity module (SIM).

A mobile computing device comprising: a processor; a first communications module coupled to the processor, the first communications module configured to receive via a first antenna wireless messages using near field communications (NFC) data standard; a second communications module coupled to the processor, the second communications module configured to receive via a second antenna wireless messages in a format different than the NFC standard; a user interaction device coupled to the processor, the user interaction device configured to provide a graphical user interface; and a memory device coupled to the processor, the memory device storing instructions executable by the processor to cause the processor to store an NFC emulated card in the memory device in response to the second communications module receiving an encrypted message in the format different that the NFC standard.

In certain implementations, a mobile computing device further comprising a subscriber identity module (SIM) coupled to the processor, wherein the NFC emulated card is stored in SIM.

In certain implementations, a mobile computing device wherein the format different than the NFC standard is at least one of a short messaging service (SMS) and multimedia messaging service (MMS).

In certain implementations, a mobile computing device wherein the NFC emulated card is configured for one time use.

What is claimed is:

1. A mobile computing system configured to enable electronic ticketing, the mobile computing system comprising:
a processor; and
a memory device coupled to the processor, the memory device being operable to store instructions executable by the processor to cause the processor to:
receive an encrypted near field communications (NFC) data exchange format (NDEF) message including a NDEF record, the NDEF record including an NDEF payload;
decrypt the NDEF message to recover the NDEF payload;
generate an NFC emulated card from the NDEF payload;
store the NFC emulated card in the memory device, the NFC emulated card being used to emulate an electronic ticket; and
transmit an encrypted outgoing NDEF message that includes the NFC emulated card using (i) an over-the-air communications standard that is different from an NFC standard, when the mobile computing system does not include an NFC interface, and (ii) the NFC standard, when the mobile computing system includes an NFC interface.

2. The mobile computing system of claim 1 further comprising instructions executable by the processor to cause the processor to:
authorize the NFC emulated card at an airline computer terminal for boarding an airplane; and
transfer records included in the electronic ticket to the airline computer terminal.

3. The mobile computing system of claim 1, wherein the encrypted NDEF message is received using an over-the-air communication standard that is different from the NFC standard.

4. The mobile computing system of claim 3, wherein the over-the-air communication standard used to receive the encrypted NDEF message is at least one of a short messaging service (SMS) and multimedia messaging service (MMS).

5. The mobile computing system of claim 1, wherein the mobile computing device is configured to communicate using an over-the-air communications standard that is compatible with at least one of IEEE 802.16 family of standards for cellular phones.

6. The mobile computing system of claim 1, wherein the mobile computing device includes a subscriber identity module (SIM), wherein the SIM includes NDEF messaging service as an embedded component.

7. The mobile computing system of claim 1, wherein the mobile computing device is configured to erase the NFC emulated card after a one time use.

8. At least one non-transitory computer-readable medium having stored thereon instructions for conducting a transaction using a mobile computing device, the instructions being executable to cause a computer processor included in the mobile computing device to:
receive an encrypted near field communications (NFC) data exchange format (NDEF) message including a NDEF record, the NDEF record including an NDEF payload;
decrypt the NDEF message to recover the NDEF payload;
generate an NFC emulated card from the NDEF payload;
store the NFC emulated card in memory, the NFC emulated card being used to store funds for conducting the transaction; and
transmit an encrypted outgoing NDEF message that includes the NFC emulated card using (i) an over-theair communications standard that is different from an NFC standard, when the mobile computing device does not include an NFC interface, and (ii) the NFC standard, when the mobile computing device includes an NFC interface.

9. The at least one computer-readable medium of claim 8, wherein the instructions being executable to further cause the computer processor to:
authorize the NFC emulated card at a merchant terminal for conducting the transaction; and
transfer the funds to complete the transaction.

10. The at least one computer-readable medium of claim 8, wherein the encrypted NDEF message is received using an over-the-air communication standard that is different from the NFC standard.

11. The at least one computer-readable medium of claim 10, wherein the over-the-air communication standard used to receive the encrypted NDEF message is at least one of a short messaging service (SMS) and multimedia messaging service (MMS).

12. The at least one computer-readable medium of claim 8, wherein the mobile computing device is configured to communicate using an over-the-air communications standard that is compatible with at least one of IEEE 802.16 family of standards for cellular phones.

13. The at least one computer-readable medium of claim 8, wherein the mobile computing device includes a subscriber identity module (SIM), wherein the SIM includes NDEF messaging service as an embedded component.

14. The at least one computer-readable medium of claim 8, wherein the mobile computing device is configured to erase the NFC emulated card after a one time use.

15. A method of implementing wireless communications in a mobile device, the method comprising:
receiving an encrypted near field communications (NFC) data exchange format (NDEF) message including a NDEF record, the NDEF record including an NDEF payload;
decrypting the NDEF message to recover the NDEF payload;
sending information recovered from the NDEF payload to a server;
receiving an NFC emulated card from the server; and
transmitting an encrypted outgoing NDEF message that includes the NFC emulated card using (i) an over-the-air communications standard that is different from an NFC standard, when the mobile device does not include an NFC interface, and (ii) the NFC standard, when the mobile device includes an NFC interface.

16. The method as recited in claim 15 further comprising:
generating an NFC emulated card from the NDEF payload, the NFC emulated card being configured for one time use.

17. The method as recited in claim 15 further comprising:
storing the NFC emulated card, the NFC emulated card being used to emulate a physical card, the NFC emulated card being configured to include confidential information also included in the physical card.

18. The method as recited in claim 15, wherein the encrypted NDEF message is received using an over-the-air communication standard that is different from the NFC standard.

19. The method as recited in claim 18, wherein the over-the-air communication standard used to receive the encrypted NDEF message is at least one of a short messaging service (SMS) and multimedia messaging service (MMS).

20. The method as recited in claim 18, wherein the over-the-air communications standard that is compatible with at least one of IEEE 802.16 family of standards for cellular phones.

21. An apparatus comprising:
an intercept module coupled to intercept an encrypted near field communications (NFC) data exchange format (NDEF) message;
a decrypter module operable to decrypt the encrypted NDEF message into a decrypted NDEF message;
a recovery module operable to recover a NDEF record from the decrypted NDEF message, the NDEF record including an NDEF payload;
a card emulation module operable to generate a NFC emulated card from the NDEF payload; and
a processor configured to cause transmission of an encrypted outgoing NDEF message that includes the NFC emulated card (i) in accordance with an over-the-air communications standard that is different from an NFC standard, when the apparatus does not include an NFC interface, and (ii) in accordance with the NFC standard, when the apparatus includes an NFC interface.

22. The apparatus as recited in claim 21, wherein the NFC emulated card is configured for one time use.

23. The apparatus as recited in claim 21, wherein the encrypted NDEF message is received using an over-the-air communication standard that is different from the NFC standard.

24. The apparatus as recited in claim 23, wherein the over-the-air communication standard used to receive the encrypted NDEF message is at least one of a short messaging service (SMS) and multimedia messaging service (MMS).

25. The apparatus as recited in claim 21, wherein the NFC emulated card is stored in a subscriber identity module (SIM).

26. A mobile computing device comprising:
a processor;
a first communications module coupled to the processor, the first communications module configured to receive via a first antenna wireless messages using near field communications (NFC) data standard;
a second communications module coupled to the processor, the second communications module configured to receive via a second antenna wireless messages in a format different than the NFC standard;
a user interaction device coupled to the processor, the user interaction device configured to provide a graphical user interface; and
a memory device coupled to the processor, the memory device storing instructions executable by the processor to cause the processor to:
store an NFC emulated card in the memory device in response to the second communications module receiving an encrypted message in the format different that the NFC standard; and
transmit an encrypted outgoing NDEF message that includes the NFC emulated card via the second communications module using an over-the-air communications standard that is different from the NFC standard.

27. The mobile computing device as recited in claim 26 further comprising a subscriber identity module (SIM) coupled to the processor, wherein the NFC emulated card is stored in SIM.

28. The mobile computing device as recited in claim 26, wherein the format different than the NFC standard used to receive the second antenna wireless messages is at least one of a short messaging service (SMS) and multimedia messaging service (MMS).

29. The mobile computing device as recited in claim 26, wherein the NFC emulated card is configured for one time use.

* * * * *